July 22, 1947. W. D. SWALLOW 2,424,259
APPARATUS FOR SETTLING SUSPENDED SOLIDS FROM LIQUID MEDIUMS
Filed Dec. 13, 1943 2 Sheets-Sheet 1

INVENTOR,
William Duncan Swallow.
BY Roy E. Hamilton,
Attorney.

July 22, 1947. W. D. SWALLOW 2,424,259
APPARATUS FOR SETTLING SUSPENDED SOLIDS FROM LIQUID MEDIUMS
Filed Dec. 13, 1943 2 Sheets-Sheet 2
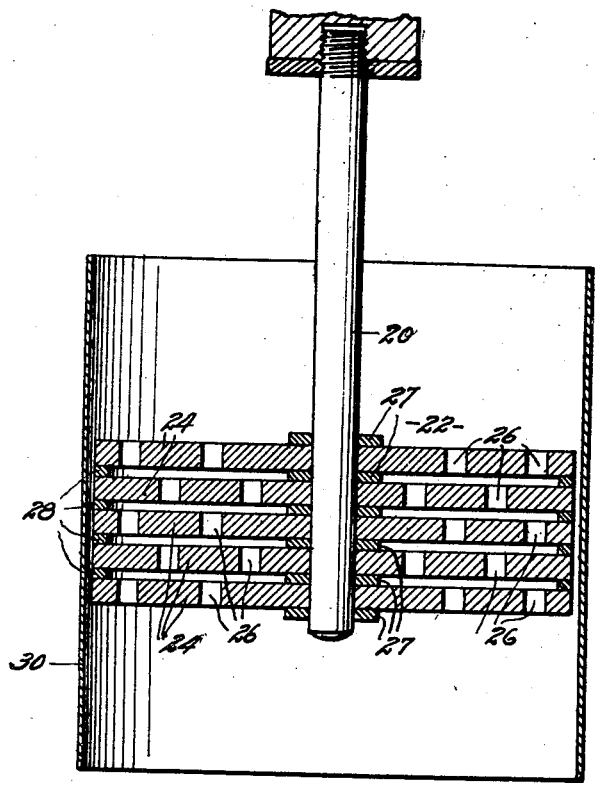
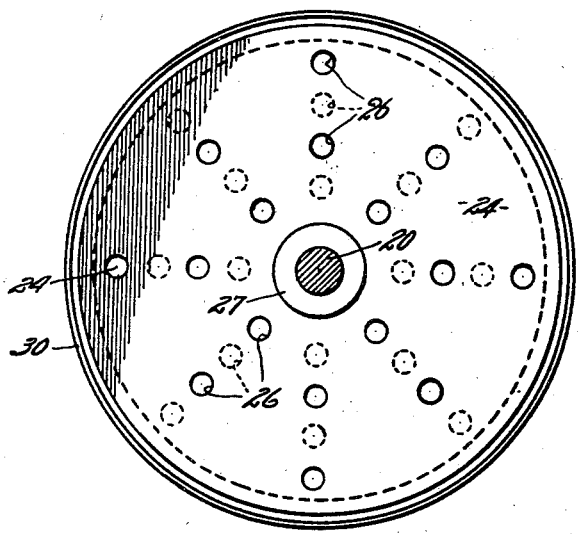
INVENTOR,
William Duncan Swallow.
BY
Roy E. Hamilton,
Attorney.

Patented July 22, 1947

2,424,259

UNITED STATES PATENT OFFICE 2,424,259

APPARATUS FOR SETTLING SUSPENDED SOLIDS FROM LIQUID MEDIUMS

William Duncan Swallow, Los Angeles, Calif., assignor of two-thirds to George S. Pelton and Herbert E. Pelton, Los Angeles, Calif.; Glenn S. Roberts executor of said William Duncan Swallow, deceased.

Application December 13, 1943, Serial No. 514,191

12 Claims. (Cl. 259—72)

This invention relates to improvements in the apparatus for flocculating and settling solids suspended in liquid mediums and has particular reference to flocculating apparatus operable by means of a vibratory motor, the frequency of which is sufficiently high to cause flocculation of solids suspended within the liquid medium.

The principal object of this invention is the provision of a flocculating and settling apparatus for settling of chemicals, minerals, mineral residues, mineral muds, wastes, slimes, tailings, escorias, etc., usually encountered in the hydrometallurgy processes used in the recovery of minerals and metals from their respective ores.

A further object of the present invention is the provision of a flocculating unit through which the charged liquid is passed in a zig-zag path in order to cause numerous contacts with the various vibratory surfaces to cause a material flocculation of the suspended particles. Since the frequency required to cause the flocculation of various materials is determined by the size of the suspended particles, their specific gravity and also the specific gravity of the medium in which they are suspended, the frequency of vibration in cycles per second is very important and must be definitely determined for the various materials. Much experimentation and actual operation of the device has shown that this variation is usually from 200 to 500 cycles per second which is much higher than the frequency of the vibratory devices now being used.

Another object of this invention is the provision of an apparatus including audio frequency vibratory flocculator positioned and operable within a body of liquid wherein the solids are settled from the liquid medium.

With these objects in view as well as other objects which will appear during the course of the specification, reference will now be had to the drawings, wherein:

Fig. 3 is an enlarged sectional view of the flocculating unit.

Fig. 4 is a sectional plan view taken on line IV—IV of Fig. 3.

Figure 1:
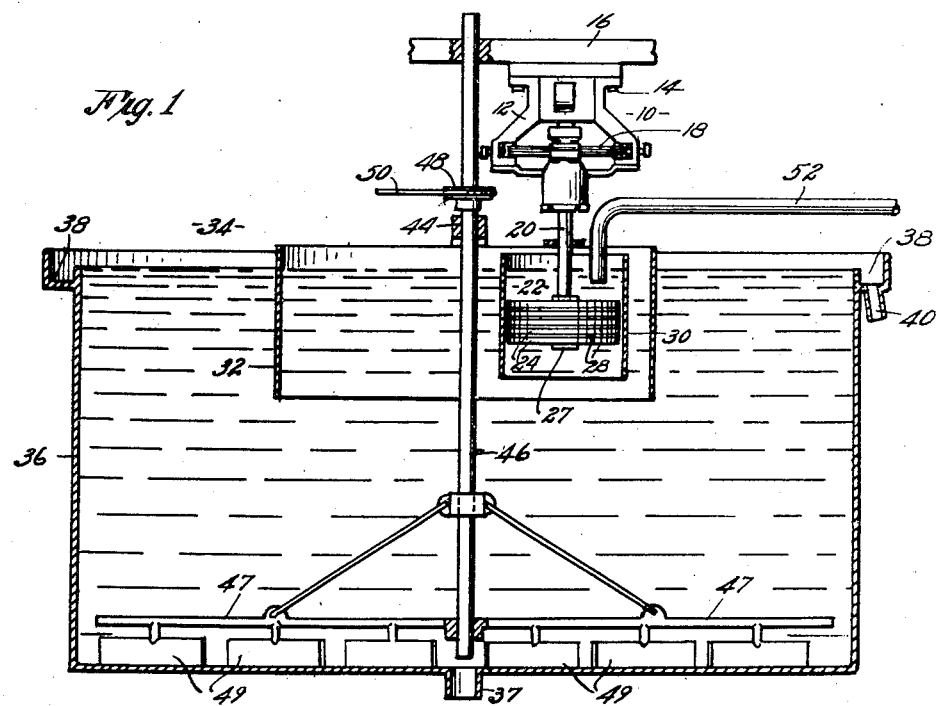
Figure 1 is an elevational view partly broken away of an apparatus for flocculating and settling solids suspended in liquid mediums, embodying this invention.

Throughout the several views like reference characters refer to similar parts and the numeral 10 designates an electric reciprocating motor such as shown and described in my Letters Patent, Nos. 2,297,084 and 2,302,983, or one of the same general type.

These motors are so constructed and driven that they will maintain a substantially constant amplitude of vibration with varying loads.

Another characteristic of these motors is that they are so operatively related to the load being vibrated that the frequency of the currents of the motor are maintained in constant step with the frequency of vibration of the load or mass being vibrated.

The motor frame 12 is rigidly supported by bolts 14 to an overhead beam 16 which in turn is rigidly carried by suitable means not shown. Frame 12 carries the spring member 18 which carries the stem 20 of the flocculator 22. This flocculator is made up of a series of spaced apart discs or plates 24, perforated at 26 to permit the solid bearing solutions to pass therethrough. Spacing washers 27 mounted on the stem 20 separate the series of discs and are welded thereto to present a rigid structure which will vibrate as a unit. The peripheral edge portions of the discs are joined together by means of rings 28 which are also preferably welded in position to stabilize the unit. The perforations or openings 26 in adjacent discs are offset so that the solution passing therethrough will necessarily contact the vibrating disc next therebelow before it reaches the opening in said lower disc thus causing the solution to travel in a zig-zag path as it travels through the flocculator. While it is advisable to have the flocculator symmetrical and well balanced on its stem by the use of concentric discs as shown, yet it is apparent that any polygonal form of plate might be well balanced as well as many other forms. The open end cylindrical tubing 30 serves as a flocculator well in which the flocculator is operatively mounted the flocculator is preferably closely fitted in the well 30 so that substantially all the pregnant solution passing through the well will pass through the openings in the flocculator discs. Well 30 is shown stationary and is secured in position on the thickener well 32 by means of bracket 54 which is rigidly secured to the well body 32; however it would be possible to secure this well 30 directly to the flocculator to oscillate therewith.

Figure 2:
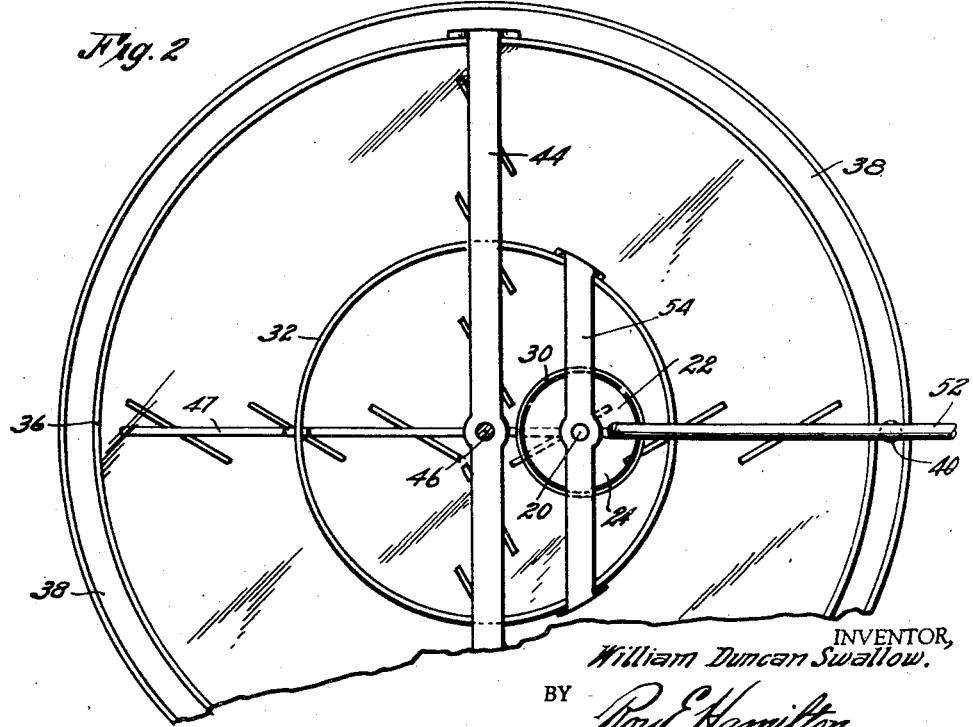
Fig. 2 is a plan view partly broken away of the apparatus shown in Fig. 1.

As clearly shown in Figs. 1 and 2 this flocculator 22 is shown in conjunction with a standard thickener 34 well known in the art. This thickener comprises a tank 36 having a central outlet 37 and an overflow trough 38 which extends about its upper edge and has a drain pipe 40. The centrally disposed well 32 extends from above the top of the tank 36 and into the tank with its lower edge spaced apart from the bottom of tank 36. A cross bar 44 serves to support the well 32 in position in the tank 36.

A vertically disposed shaft 46 rotatably mounted in bar 44 and beam 16 extends adjacent the bottom of the tank 36 and is provided with radial arms 47 carrying rakes 49 properly positioned to force the particles collected at the bottom of the tank toward the central outlet 37. Suitable means such as a pulley 48 driven by belt 50 which is driven by a power unit not shown, causes a rotation of shaft 46 and its associated parts to deliver the accumulation of particles to the central outlet 37. The well 32 extends downwardly into tank 36 which is always kept full to overflowing so that the murky solution will settle below the lower edge of the well 32 before it encounters any rising currents. The solution to be flocculated and settled enters the apparatus through pipe 52 and into the flocculator well 30, passes through the well and from well 32 into tank 36 where the heavier flocculated materials have a tendency to settle to the bottom and the cleaner and lighter liquid tends to rise between the well 32 and the wall of tank 36 to overflow into trough 38 thence out through drain pipe 40.

The high speed of vibration of the solution as it passes through the vibrating flocculator causes an accumulation of flocculation of the small particles of values, whereby they cannot remain suspended in the liquid and settle to the bottom of the container.

Since the type of electric motor shown herein is thoroughly described, especially in my Patent No. 2,297,084, the electrical motor circuits are not shown or described in this application. In this particular type of electric reciprocating motor there is provided a reciprocal armature of variable mass corresponding to the present flocculation, which is adapted to be vibrated at relatively high frequencies by a vibratory member, also there is provided means within the motor circuit to automatically maintain the frequency of the electric current to the drive coil of the motor in synchronism with the vibratory frequency of the mechanical vibratory member. While this type of motor is well suited for use with this flocculator, however, it is apparent that other driving means capable of supplying audio frequency vibrations to the flocculator, as varying loads are fed thereto, might be used without departing from the spirit of the invention.

As clearly explained in my Patent No. 2,302,983, the reciprocating motor is so constructed and connected that the frequency of alternation of the current will be in step with the frequency of vibration of the flocculating member which is being vibrated. This is true regardless of the variation in the mass being moved. Furthermore, the motor or power unit is adapted to be fed by any desired current to produce a predetermined amplitude of vibration of spring 18 and the flocculator 20. The frequency of vibration of the spring member 18 in this type of motor is adapted to be varied by changing the effective vibratory length of the spring.

It is quite apparent that this type of electric power unit is well adapted to produce a uniform frequency of vibration of a flocculator at any desired amplitude.

That I claim as new and desire to be secured by Letters Patent is:

1. An apparatus for settling solids suspended in a liquid medium comprising a tank containing a liquid, a flocculator partially immersed in the liquid in the upper portion of said tank and including a series of closely spaced perforated plates secured together at their centers and at their peripheries and positioned with the perforation in adjacent plates offset whereby liquid passing through the flocculator will travel in a zig-zag path; and electrical power means to vibrate said flocculator at audio frequency as said pregnant medium is passed therethrough.

2. An apparatus for flocculating and settling solids suspended in a liquid medium comprising a thickener tank containing a liquid; a flocculator partially immersed in said liquid and including a series of closely spaced perforated plates positioned with the perforations in adjacent plates offset whereby liquid passed downwardly through the flocculator will move in a zig-zag path, said plates being spaced above the bottom of said tank; means at the edges of said discs to close the spaces between adjacent discs; and an electrical reciprocating motor adapted to vibrate said flocculator at audio frequency as said pregnant liquid medium is passed therethrough whereby the suspended solids in said liquid medium are flocculated and caused to settle in said tank.

3. In apparatus for settling solids suspended in a liquid, the combination of: a tank provided with means for permitting overflow of liquid therefrom; a centrally disposed well mounted in the upper portion of said tank; a flocculator associated with said tank including a vibratory plate disposed within said well; means for introducing liquid into said well; and electrical means for vibrating said plate at audio frequency, whereby solids suspended in the liquid within said well are flocculated and caused to settle to the bottom of said tank.

4. In apparatus for settling solids suspended in a liquid, the combination of: a tank provided with means for permitting overflow of liquid therefrom; a centrally disposed well mounted in the upper portion of said tank; a vibratory plate disposed within said well and surrounded by an open ended housing; means for supplying liquid to the upper end of said housing above said plate; and an electric reciprocating motor mounted above said tank and adapted to vibrate said plate at audio frequencies, whereby solids suspended in the liquid within said well are flocculated and caused to settle to the bottom of said tank.

5. In apparatus for settling solids suspended in a liquid, the combination of: a tank having influx and overflow means; a plurality of perforated plates secured in spaced relation in said tank adjacent said influx means and adapted to be vibrated as a unit therein; and electrical power means connected to said plates adapted to vibrate them at audio frequency whereby solids suspended in liquid vibrated by said plates will be flocculated by said vibration and caused to settle in said tank while permitting relatively solid free liquid to overflow therefrom.

6. In apparatus for settling solids suspended in a liquid, the combination of: a tank having influx and overflow means; a plurality of perforated plates secured in spaced relation adjacent said influx means and adapted to be vibrated as a unit within said tank, said plates being positioned with the perforations in adjacent plates offset whereby liquid passing from one side of said unit to the other into said tank will travel in a zig-zag path through said perforations; and electrical power means connected to said plates adapted to vibrate them at audio frequency whereby solids suspended in liquid vibrated by said plates will be flocculated by said vibration and caused to settle in said liquid.

7. In apparatus for settling solids suspended in a liquid, the combination of: a tank having influx and overflow means; a plurality of plates secured in spaced relation disposed adjacent said influx means and adapted to be vibrated as a unit within said tank, said plates being provided with constraining means for causing liquid passing from one side of said unit to the other to travel in a zig-zag path in contact with said plates; and electrical power means connected to said plates adapted to vibrate them at audio frequency whereby solids suspended in liquid vibrated by said plates will be flocculated by said vibration and caused to settle in said liquid.

8. In apparatus for settling solids suspended in a liquid, the combination of: a tank having overflow means; a plurality of perforated plates secured in spaced relation and adapted to be vibrated as a unit within said tank; an open ended housing surrounding said plates and constraining liquid entering said tank to contact with said plates; means adapted to supply liquid to the upper end of said housing for passage therethrough into said tank; and electrical power means connected to said plates adapted to vibrate them at audio frequency whereby solids suspended in liquid vibrated by said plates will be flocculated by said vibration and caused to settle in said liquid.

9. In apparatus for settling solids suspended in a liquid, the combination of: a tank provided with means for permitting overflow of liquid therefrom; a centrally disposed well mounted in the upper portion of said tank; a plurality of perforated plates secured in spaced relation within said well and surrounded by an open ended housing; means for supplying liquid to the upper end of said housing above said plates; and an electric reciprocating motor mounted above said tank and adapted to vibrate said plates at audio frequencies, whereby solids suspended in the liquid within said well are flocculated and caused to settle to the bottom of said tank.

10. In apparatus for settling solids suspended in a liquid, the combination of: a tank provided with means for permitting overflow of liquid therefrom; a centrally disposed well mounted in the upper portion of said tank; a flocculator associated with said tank including a plurality of perforated vibratory plates disposed within said well; means for introducing liquid into said well; and electrical means for vibrating said plates at audio frequencies whereby solids suspended in the liquid within said well are flocculated and caused to settle to the bottom of said tank.

11. In apparatus for settling solids suspended in a liquid, the combination of: an open ended housing; means for feeding liquid to one end of said housing and allowing its emergence at the other end thereof; a perforated plate laterally mounted in said housing for vibration therein; means for vibrating said plate at not less than audio frequency to thereby vibrate liquid flowing through said housing and flocculate the solids therein; a tank adjacent the emergence end of said housing adapted to receive said liquid for relatively stagnant accumulation therein, whereby to permit settling of said flocculated solids; overflow means at the upper edge of said tank to permit escape of relatively solid-free liquid from said tank; and outlet means in the bottom of said tank to permit escape of said settled solids.

12. In apparatus for settling solids suspended in a liquid, the combination of: a tank provided with means for permitting overflow of liquid therefrom; a centrally disposed well mounted in the upper portion of said tank; a flocculator associated with said tank including a plurality of perforated vibratory plates disposed within said well; means for introducing liquid into said well; housing means surrounding said flocculator adapted to direct substantially all of said introduced liquid through said perforated plates; electrical means for vibrating said plates at audio frequencies whereby solids suspended in the liquid within said well are flocculated and caused to settle to the bottom of said tank; and collector rakes adapted to direct settled solids to said outlet.

WILLIAM DUNCAN SWALLOW.

REFERENCES CITED

The following references are of record in the file of this patent:

UNITED STATES PATENTS

| Number | Name | Date |
| --- | --- | --- |
| 2,306,649 | Swallow | Dec. 29, 1942 |
| 1,739,302 | Gregorich | Dec. 10, 1929 |
| 1,752,795 | Hoover e al. | Apr. 1, 1930 |
| 2,268,475 | Darby | Dec. 30, 1941 |
| 1,983,968 | Clark | Dec. 11, 1934 |
| 2,268,726 | Tark | Jan. 6, 1942 |
| 2,316,783 | Geary | Apr. 20, 1943 |
| 2,070,201 | Geary | Feb. 9, 1937 |
| 86,002 | Coffman | Jan. 19, 1869 |
| 141,480 | Archer | Aug. 5, 1873 |
| 69,653 | Gilman | Oct. 8, 1867 |
| 1,052,549 | Yearta | Feb. 11, 1913 |
| 1,318,740 | Fessenden | Oct. 11, 1919 |
| 1,705,162 | Wahl | Mar. 12, 1929 |
| 1,842,232 | Baker | Jan. 19, 1932 |
| 2,093,898 | Taplin | Sept. 21, 1937 |

FOREIGN PATENTS

| Number | Country | Date |
| --- | --- | --- |
| 356,783 | Great Britain | Sept. 10, 1931 |
| 231,271 | Germany | Feb. 20, 1911 |